J. C. BACKERT.
CUTTER.
APPLICATION FILED DEC. 24, 1914.
1,136,085.
Patented Apr. 20, 1915.
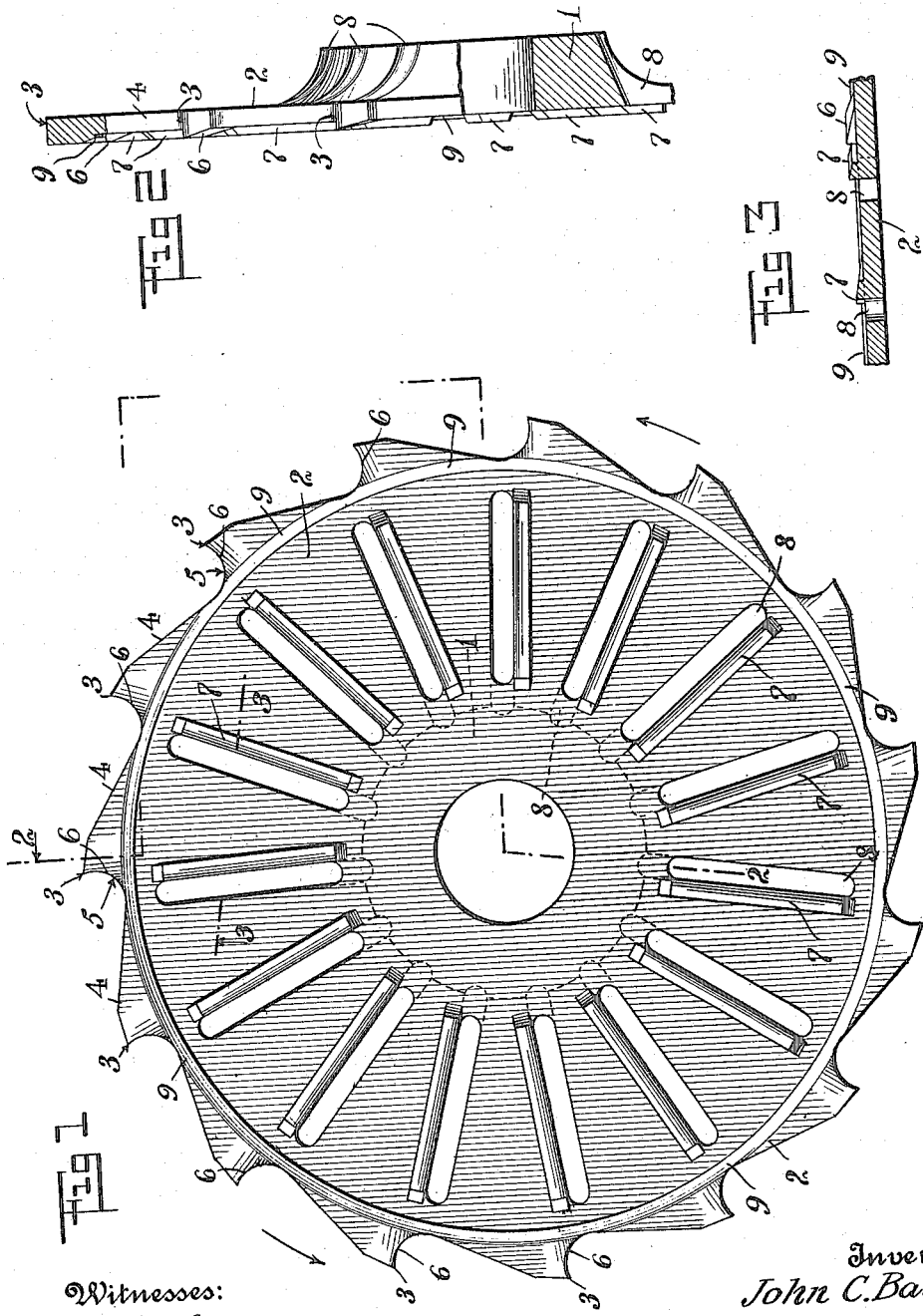
Witnesses:
C. J. Hachenberg
H. J. White
Inventor
John C. Backert
By his Attorneys

UNITED STATES PATENT OFFICE.

JOHN C. BACKERT, OF NEW YORK, N. Y.

CUTTER.

1,136,085.

Specification of Letters Patent. Patented Apr. 20, 1915.

Application filed December 24, 1914. Serial No. 878,877.

*To all whom it may concern:*

Be it known that I, JOHN C. BACKERT, a citizen of the United States, residing at the city of New York, borough of Brooklyn, county of Kings, and State of New York, have invented certain new and useful Improvements in Cutters, of which the following is a full, clear, and exact description.

This invention relates to cutters and more particularly to a cutting tool of the rotating disk type, which is effective to both cut and trim or smooth, and is peculiarly adapted for treating metal slugs and rules such as are used in the printing trade.

The particular construction of this invention is one which makes the tool entirely self-clearing and which also produces a very effective cutting and trimming action.

A preferable embodiment of the invention is described in detail in the following specification, taken in connection with the following drawings, in which—

Figure 1 is a view in side elevation of the inner or swaging face of the disk. Fig. 2 is an irregular vertical section taken on the line 2—2 of Fig. 1. Fig. 3 is a fragmentary horizontal section on the line 3—3 of Fig. 1.

Referring to the drawings by numerals, 1 indicates the apertured hub of the disk body and 2 the main disk body thereof, the hub portion being laterally extended from the disk body. The peripheral face of this disk body is provided with a plurality of transversely extending cutting teeth whose edges are indicated at 3, the face of the disk rearwardly of these teeth being cut inwardly as indicated at 4 and curved outwardly to the point of the next adjacent toothed edge 3, forming a pocket 5 of substantially the same width, in which the slivers of metal may curl up and from which they will escape as hereinafter seen. These edges 3 are primarily cutting edges. On the inner face of the disk, or on that face of the disk adjacent the work, the surface at the inner edge of the pockets 5 is raised to form curved trimming edges 6, and these edges extend from the cutting edges 3 at the outside edge of the disk to a point adjacent the base line of the pockets 5 being slightly beveled downwardly to the face of the disk which, from a point below the pockets 5, outwardly, is elevated relatively to the inner surface of the disk, forming an annular packing face 9.

On the face of the disk 2, at a plurality of points inwardly of and in substantial alinement with the trimming edges 6, are provided radially extending raised second trimming cutters 7, these cutters at their cutting edges being elevated above the flat surface of the disk body 2 and being beveled downwardly to that flat surface rearwardly of their cutting edges. Adjacent and forwardly of each of these trimming cutters 7 the face of the disk body 2 is provided with elongated clearance slots 8, these slots extending substantially parallel with the cutting edges 7 and for the full length of said cutting edges being further extended across the face of the hub 1 in the form of grooves, as indicated in Fig. 2, the clearance slots extending through the body of the cutter from the inner to the outer face, their inner ends merging into the hub grooves which serve to feed the slivers and other shavings away from the operative cutting part of the tool.

From an inspection of the drawings it will be evident that the inner face of the disk body 2 is flat, and is below the inner trimming cutters 7, the packing face 9 and outer trimming cutters 6. There is, therefore, a passage formed around the cutters 7 inwardly of this packing face so that slivers of metal severed by the cutters 7 may pass to an adjacent slot 8, the adjacent cutters 7 stopping and diverting the shavings into these slots.

In action, when the disk is rotated and the material to be cut is fed thereagainst, the cutting teeth or edges 3 will first act upon the material which will be grooved, and as the cutters penetrate, will be at least partially smoothed by the side trimming edges 6. During this cutting and trimming action the material cut will pare off or curl up in the form of slivers or shavings and will be caught within the pockets 5, and as the tool rotates will drop by gravity downwardly out of said pockets and away from the tool. The packing face 9, being elevated and almost in the plane of the trimming cutters 6, will, therefore, be closely adjacent the side of the slot cut into the material and will prevent these shavings and slivers from passing inwardly toward the cutters 7 and jamming between the trimming cutters 6—7. As the cutter penetrates still farther into the material, the trimming cutters 7 will come into play smoothing the surface which has been heretofore cut and roughly smoothed and giving it a finished appearance when the operation is completed. Any slivers which are made by the cutters 7 will drop in an adjacent slot 8 and be ejected from the cutter in an obvious manner.

It will be evident that with a cutter such as I have described a clean finished cut may be obtained and that the cutter may be operated at high speed owing to the rapid clearing of the slivers and shavings.

While I have herein described a specific embodiment of my invention, I desire it understood that the same is susceptible of substantial variation in structure and in relative arrangement of parts within the spirit of the invention and the scope of the appended claims.

What I claim, therefore, and desire to secure by Letters Patent is:

1. A disk cutter having its peripheral surface provided with a transverse cutting edge and with an adjacent inwardly curving shaving pocket of substantially the same width as said cutting edge.

2. A disk cutter having its peripheral surface provided with alternating transverse cutting edges and inwardly curved shaving receiving pockets of substantially the same width as said cutting edges.

3. A disk cutter having its peripheral surface provided with transverse cutting edges, said surface rearwardly of each cutting edge extending inwardly therefrom and thence curving outwardly to the next adjacent cutting edge to form a curved shaving pocket inwardly and forwardly of each cutting edge and of substantially the same width as its cutting edge.

4. A disk cutter having its peripheral surface provided with a transverse cutting edge and with a shaving pocket extending inwardly and forwardly therefrom, the inner or work face of said disk having a packing surface thereon inwardly of said pocket and having a trimming edge inwardly of said packing surface.

5. A disk cutter having its peripheral surface provided with a plurality of transverse cutting edges with shaving pockets extending inwardly and forwardly therefrom, the inner or work face of said disk having an annular packing surface inwardly of said pockets and having also trimming edges inwardly of said annular packing surface.

6. A disk cutter having its peripheral surface provided with transverse cutting edges alternating with shaving pockets extending inwardly and forwardly of said edges, the inner or work face of said disk having a relatively elevated packing surface extending around said disk face inwardly of said pockets and having also trimming edges inwardly of said packing surface.

7. A disk cutter having its peripheral surface provided with transverse cutting edges alternating with shaving pockets curving inwardly and forwardly therefrom, the inner or work face of said disk having a relatively elevated packing surface extending around said disk inwardly of said pockets and having also trimming edges inwardly of said packing surface.

8. A disk cutter having its peripheral surface provided with transverse cutting edges and with shaving pockets extending inwardly and forwardly therefrom, the inner or work face of said disk having relatively raised trimming edges extending from said cutting edges inwardly of the disk face.

9. A disk cutter having its peripheral surface provided with transverse cutting edges and with shaving pockets extending inwardly and forwardly therefrom, the inner or work face of said disk having relatively raised trimming edges extending from said cutting edges inwardly of the disk face and about the edges of said pockets.

10. A disk cutter having its peripheral surface provided with transverse cutting edges and with shaving pockets curving inwardly and forwardly from said edges, the inner or work face of said disk having relatively raised side trimming edges extending from said cutting edges inwardly of the disk face and around, in part at least, of the curved edges of said pockets.

11. A disk cutter having its peripheral surface provided with alternating transverse cutting edges and shaving pockets curving inwardly and forwardly from said edges, the inner or work face of said cutter having relatively raised trimming edges extending inwardly of the disk face from said transverse cutting edges and about the curved edges of said pockets.

12. A disk cutter having its peripheral surface provided with a transverse cutting edge with a shaving pocket extending inwardly and forwardly therefrom, the inner or work face of said disk having a trimming edge adjacent said pocket and inwardly of said cutting edge, said disk face also having a relatively elevated packing surface inwardly of said pocket and trimming edge.

13. A disk cutter having its peripheral surface provided with a plurality of transverse cutting edges with shaving pockets extending inwardly and forwardly from said edges, the inner or work face of said disk having trimming edges extending inwardly from said cutting edges and about the edges of said pockets, said disk face inwardly and, inwardly of said pockets, having an annular packing surface extending around inwardly said pockets and trimming edges.

14. A disk cutter having its peripheral surface provided with transverse cutting edges alternating with shaving pockets extending inwardly and forwardly thereof, the inner or work face of said disk having trimming edges extending inwardly from said cutting edges and about said pockets, said inner disk face having also an annular packing surface extending therearound inwardly of said pockets and trimming edges.

15. A disk cutter having a laterally extending hub portion at its outer face and having a trimming edge on its inner or work face, said trimming edge being raised relatively to the adjacent face of the cutter, said cutter having a clearance slot therein adjacent said trimming edge, said clearance slot extending through said cutter, said hub portion having a groove therein communicating with the inner end of said slot.

16. A disk cutter having its peripheral surface provided with a transverse cutting edge and with an adjacent inwardly extending shaving pocket, the operative face of said cutter having a trimming edge thereon beginning at said transverse edge and extending inwardly therefrom about the edge of said pocket, said cutter face also having a second inwardly spaced trimming edge, said trimming edges being raised relatively to the face of the disk.

17. A disk cutter having its peripheral surface provided with a transverse cutting edge and with an adjacent inwardly extending shaving pocket, the operative face of said cutter inwardly from said transverse edge and about the edge of said pocket being provided with a trimming edge, and with a second inwardly spaced trimming edge in substantial alinement with the first, said edges being raised relatively to the face of the disk, said disk adjacent said second trimming edge having a clearance slot therethrough, there being a packing surface inwardly of said pocket and first trimming edge to confine the material cut by said transverse and first trimming edges to said pocket.

18. A disk cutter having its peripheral face, provided with transverse cutting edges having shaving pockets extending inwardly and forwardly therefrom, the inner or work face of said cutter having trimming edges extending inwardly from said cutting edges about the edges of said pockets and having also other trimming edges inwardly of and spaced from the first edges with clearance slots through said disk adjacent said second trimming edges, there being a packing surface inwardly of said pockets and first named trimming edges and outwardly of said second trimming edges, said surface acting to confine the material cut by said transverse and first trimming cutters to said pockets.

19. A disk cutter having its peripheral surface provided with transverse cutting edges and with shaving pockets curving inwardly and forwardly therefrom, the operative face of said cutter having a trimming edge extending inwardly from each of said transverse cutting edges about said curved pockets, and having a second trimming edge spaced inwardly from each of the first and in substantial alinement therewith, said edges being raised relatively to the adjacent face of the disk, said disk having a clearance slot therein adjacent and forwardly of each second trimming edge.

20. A disk cutter having its peripheral surface provided with transverse cutting edges and with shaving pockets curving inwardly and forwardly therefrom, the operative face of said cutter having a trimming edge extending inwardly from each of said transverse cutting edges and about said curved pockets, and having a second trimming edge spaced inwardly from each of the first and in substantial alinement therewith, said edges being raised relatively to the adjacent face of the disk, said disk having a clearance slot therein adjacent and forwardly of each second trimming edge, there being a packing surface inwardly of said pockets and first named trimming edges and outwardly of said second trimming edges, said surface acting to confine the material cut by said transverse and first trimming cutters to said pockets.

JOHN C. BACKERT.

Witnesses:
HENDERSON F. HILL,
R. C. MITCHELL.

Copies of this patent may be obtained for five cents each, by addressing the "Commissioner of Patents, Washington, D. C."